United States Patent
Tohara et al.

(10) Patent No.: US 9,703,178 B2
(45) Date of Patent: Jul. 11, 2017

(54) PROJECTOR HAVING A ROD INTEGRATOR WITH AN ENTRANCE PLANE SMALLER THAN AN AREA LIGHT SOURCE

(71) Applicant: CANON KABUSHIKI KAISHA, Tokyo (JP)

(72) Inventors: Masakazu Tohara, Komae (JP); Takashi Urakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 14/139,057

(22) Filed: Dec. 23, 2013

(65) Prior Publication Data

US 2014/0185017 A1 Jul. 3, 2014

(30) Foreign Application Priority Data

Dec. 28, 2012 (JP) ................. 2012-288562

(51) Int. Cl.
*G03B 21/00* (2006.01)
*G03B 21/20* (2006.01)

(52) U.S. Cl.
CPC ......... *G03B 21/008* (2013.01); *G03B 21/208* (2013.01); *G03B 21/2033* (2013.01)

(58) Field of Classification Search
CPC ............. G03B 21/208; G03B 21/2013; G03B 21/2033; H04N 9/3197
USPC ................. 353/30, 31, 37, 38, 99, 102; 348/743–747; 359/629
See application file for complete search history.

(56) References Cited

U.S. PATENT DOCUMENTS

| 5,860,721 A * | 1/1999 | Bowron | H04N 9/3152 348/E5.137 |
| 6,851,811 B2 * | 2/2005 | Akiyama | G02B 26/008 348/743 |
| 6,905,214 B2 | 6/2005 | Tani | |
| 2004/0041984 A1 * | 3/2004 | Tani et al. | 353/20 |

(Continued)

FOREIGN PATENT DOCUMENTS

| JP | 2004-093623 A | 3/2004 |
| JP | 2004-094115 A | 3/2004 |

(Continued)

OTHER PUBLICATIONS

U.S. Appl. No. 14/139,082, filed Dec. 23, 2013.

(Continued)

*Primary Examiner* — Sultan Chowdhury
(74) *Attorney, Agent, or Firm* — Fitzpatrick, Cella, Harper & Scinto

(57) ABSTRACT

A projector includes an area light source, a spatial light modulator, an illumination system that receives light from the area light source and illuminates the spatial light modulator, and a projection lens that forms an image by the light from the spatial light modulator. The area light source includes one of a light emitting region of a light emitting device and an image of the light emitting region, and the illumination system includes a rod integrator, the rod integrator is arranged so that an entrance plane of the rod integrator faces the area light source, and a size of the entrance plane of the rod integrator is smaller than a size of the area light source.

13 Claims, 4 Drawing Sheets

(56) References Cited

U.S. PATENT DOCUMENTS

| | | | |
|---|---|---|---|
| 2004/0057027 A1* | 3/2004 | Tani | G03B 21/208 353/102 |
| 2005/0128441 A1* | 6/2005 | Morgan | G03B 21/2033 353/102 |
| 2006/0044523 A1* | 3/2006 | Teijido et al. | 353/53 |
| 2007/0121085 A1* | 5/2007 | Dewald | 353/99 |
| 2007/0146639 A1* | 6/2007 | Conner | 353/20 |
| 2008/0259286 A1* | 10/2008 | Suzuki et al. | 353/31 |
| 2009/0033878 A1* | 2/2009 | Shirai et al. | 353/37 |
| 2012/0194787 A1* | 8/2012 | Sawai | G03B 21/2013 353/31 |
| 2012/0224148 A1* | 9/2012 | Natsumeda et al. | 353/20 |

FOREIGN PATENT DOCUMENTS

| | | |
|---|---|---|
| JP | 2005-300712 A | 10/2005 |
| JP | 2006-220911 A | 8/2006 |
| JP | 2013-210518 A | 10/2013 |

OTHER PUBLICATIONS

Masakazu Tohara, U.S. Appl. No. 14/139,082, filed Dec. 23, 2013.
Dfficial Action dated Nov. 7, 2016, in Japanese Patent Application No. 2012-288562.

* cited by examiner

PROJECTOR HAVING A ROD INTEGRATOR WITH AN ENTRANCE PLANE SMALLER THAN AN AREA LIGHT SOURCE

BACKGROUND OF THE INVENTION

Field of the Invention

The present invention relates to a projector.

Description of the Related Art

In a projector, a rod integrator is used to uniformly illuminate a spatial light modulator with light from a light source. As the light source, using an area light source such as an LED has become popular. Each of Japanese Patent Laid-Open Nos. 2006-220911 and 2004-93623 describes an apparatus including an LED and a rod integrator. In the apparatus described in Japanese Patent Laid-Open No. 2006-220911, the size of the entrance plane of the rod integrator is the same as that of the light emitting plane of the LED. In the apparatus described in Japanese Patent Laid-Open No. 2004-93623, the size of the entrance plane of the rod integrator is made larger than that of the light emitting plane of the LED to cause the entrance plane of the rod integrator to capture light from the LED as much as possible.

In the apparatus described in Japanese Patent Laid-Open No. 2006-220911, however, highly accurate alignment is necessary because the light capturing amount from the LED decreases if the LED and the rod integrator are shifted with respect to a direction perpendicular to the optical axis.

In the apparatus described in Japanese Patent Laid-Open No. 2004-93623 as well, the LED and the rod integrator need to be aligned at a high accuracy. In the apparatus described in Japanese Patent Laid-Open No. 2004-93623, the alignment accuracy is raised by, for example, holding the LED and the rod integrator using the same member. However, since the processing accuracy of the holding member needs to be high, the cost increases. In addition, when holding the LED and the rod integrator using the same member, exchanging the LED takes a long time because the rod integrator also needs to be detached when exchanging the LED.

SUMMARY OF THE INVENTION

The present invention provides a technique advantageous in lowering the accuracy required when aligning an area light source and a rod integrator.

A first aspects of the present invention provides a projector including an area light source, a spatial light modulator, an illumination system that receives light from the area light source and illuminates the spatial light modulator, and a projection lens that forms an image by the light from the spatial light modulator, wherein the area light source comprises one of a light emitting region of a light emitting device and an image of the light emitting region, and the illumination system includes a rod integrator, the rod integrator is arranged so that an entrance plane of the rod integrator faces the area light source, and a size of the entrance plane of the rod integrator is smaller than a size of the area light source.

Further features of the present invention will become apparent from the following description of exemplary embodiments with reference to the attached drawings.

DESCRIPTION OF THE EMBODIMENTS

The embodiments of the present invention will now be described with reference to the accompanying drawings.

Figure 1:
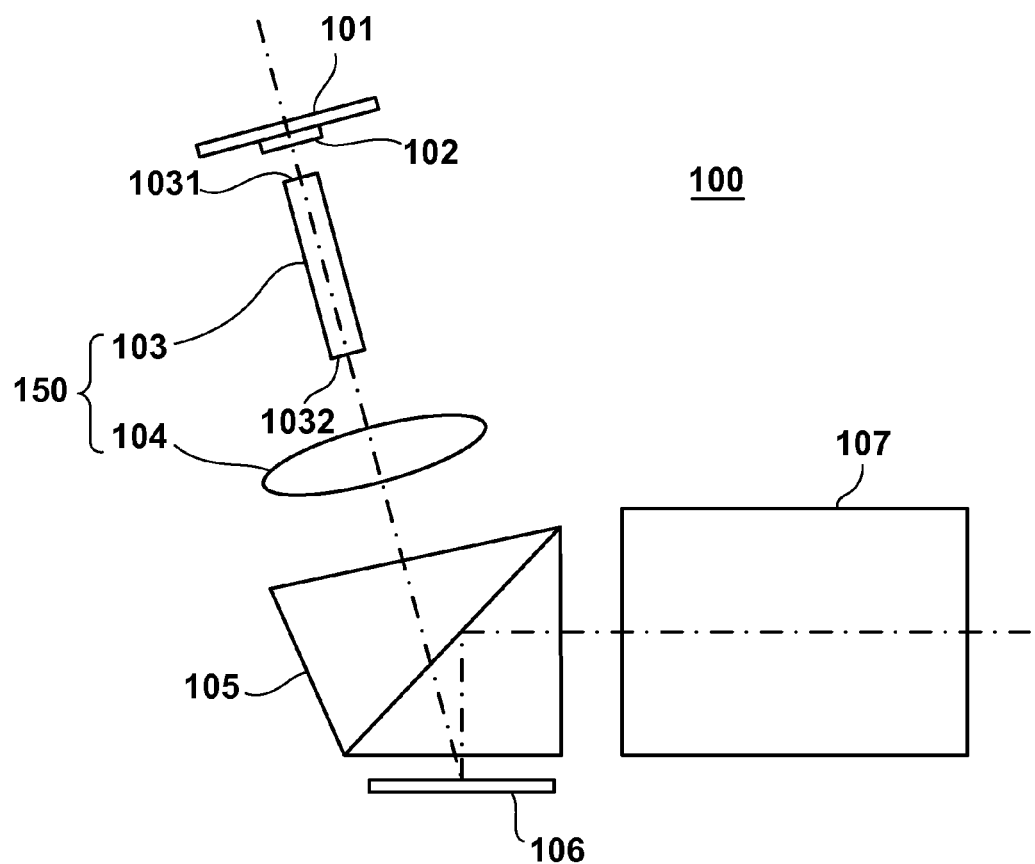
FIG. 1 is a view showing the schematic arrangement of a projector according to the first embodiment.

FIG. 1 shows the schematic arrangement of a projector 100 according to the first embodiment of the present invention. The projector 100 can include an area light source 102, a spatial light modulator 106, an illumination system 150 that receives light from the area light source 102 and illuminates the spatial light modulator 106, and a projection lens 107 that forms, on a screen, an image by the light from the spatial light modulator 106.

The area light source 102 can be, for example, the light emitting region of a light emitting device 101 such as an LED but may be the image of the light emitting region. The image of the light emitting region can be formed at a position (image plane) conjugate to the light emitting region (object plane) of the light emitting device 101 by an optical system (not shown). The area light source 102 has, for example, a rectangular shape. The spatial light modulator 106 can be, for example, a device such as a DMD (Digital Mirror Device).

The illumination system 150 can include a rod integrator 103 and a relay lens 104. The rod integrator 103 can be an optical member having a cuboid shape and including an entrance plane 1031 and an exit plane 1032. Alternatively, the entrance plane 1031 of the rod integrator 103 can be rectangular. The rod integrator 103 is arranged while making the entrance plane 1031 face the area light source 102. The rod integrator 103 causes the entrance plane 1031 to receive light emitted by the area light source 102 and the side surfaces to reflect the light a plurality of times, thereby forming a uniform illuminance distribution on the exit plane 1032.

The size of the entrance plane 1031 of the rod integrator 103 is smaller than that of the area light source 102. In other words, the entrance plane 1031 of the rod integrator 103 has a shape and size fitted inside the outer edge of the area light source 102 (the light emitting region of the light emitting device 101 or an image thereof). The relay lens 104 illuminates the spatial light modulator 106 with the light from the exit plane of the rod integrator 103. The projection lens 107 projects an image by the light from the spatial light modulator 106 onto the screen.

The projector 100 may include a TIR (Total Internal Reflection) prism 105. The TIR prism 105 is formed by bonding two triangular prisms at a very small air gap. The TIR prism 105 transmits light from the relay lens 104, and reflects the light reflected by the spatial light modulator 106 by the interface between the two triangular prisms.

In the first design example that is one design example of the first embodiment, the size of the area light source 102 is 4×3 mm. The rod integrator 103 has a cuboid shape. The size of the entrance plane 1031 of the rod integrator 103 is 3.6×2.7 mm, and the length of the rod integrator 103 (the distance between the entrance plane 1031 and the exit plane 1032) is 20 mm. The size of the spatial light modulator 106 is 11.2×8.4 mm. The f-number of the projection lens 107 on the object side is 2.4.

Figure 2:
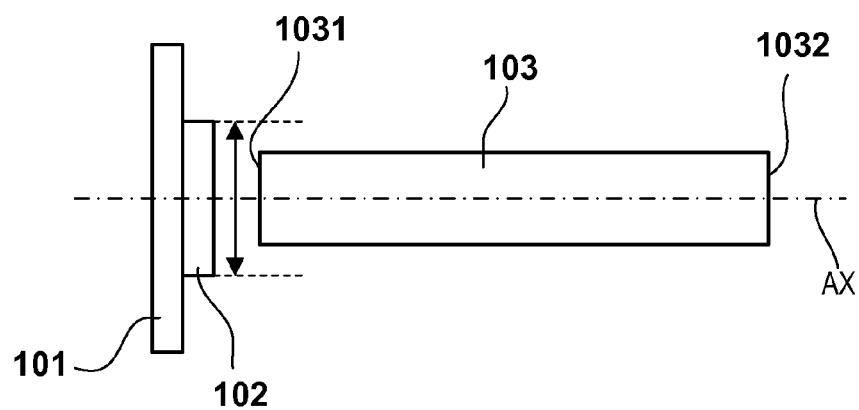
FIG. 2 is a view for explaining the first embodiment.

As illustrated in FIG. 2, in the first embodiment, the size of the entrance plane 1031 of the rod integrator 103 is smaller than that of the area light source 102. For this reason, even if the area light source 102 and the rod integrator 103 are relatively shifted with respect to a direction perpendicular to an optical axis AX, the decrease in the amount of light capturing by the rod integrator 103 from the area light source 102 is small as long as the entrance plane 1031 of the rod integrator 103 falls within the range of the size of the area light source 102 (indicated by an arrow in FIG. 2). Hence, the alignment accuracy required between the area light source 102 and the rod integrator 103 with respect to the direction perpendicular to the optical axis AX becomes low. This, for example, obviates the necessity of accurately processing the holding member of the area light source 102 and the rod integrator 103. It is therefore possible to reduce the cost. In addition, the attachment accuracy of the area light source 102 required when exchanging it due to a fault or the like is low. This facilitates the exchange.

When the size of the entrance plane 1031 of the rod integrator 103 is smaller than that of the area light source 102, the amount of light that the rod integrator 103 can capture from the area light source 102 is small as compared to a case in which the size of the entrance plane of the rod integrator is equal to or larger than that of the area light source.

However, when the size of the entrance plane 1031 of the rod integrator 103 is small, the capturing angle of light from the area light source 102 is small, and the radiation solid angle of light from the exit plane 1032 of the rod integrator 103 is small. The product of the radiation solid angle and the sectional area of the light beam is conserved based on the etendue conservation law. For this reason, when the size of the entrance plane 1031 of the rod integrator 103 is small, the area ratio between the spatial light modulator 106 and the entrance plane 1031 of the rod integrator 103 becomes large accordingly. Hence, when the size of the entrance plane 1031 of the rod integrator 103 is small, the solid angle of light that enters the spatial light modulator 106 becomes small. For the above-described reasons, in the first embodiment, the solid angle of light that enters the spatial light modulator 106 becomes small as compared to a case in which the size of the entrance plane 1031 of the rod integrator 103 is equal to or larger than that of the area light source 102. The solid angle of light that the projection lens 107 can capture is determined by the f-number of the projection lens 107 on the object side. Hence, the smaller the solid angle of light that enters the spatial light modulator 106 is, the larger the amount of light that the projection lens 107 can capture is.

Figure 3:
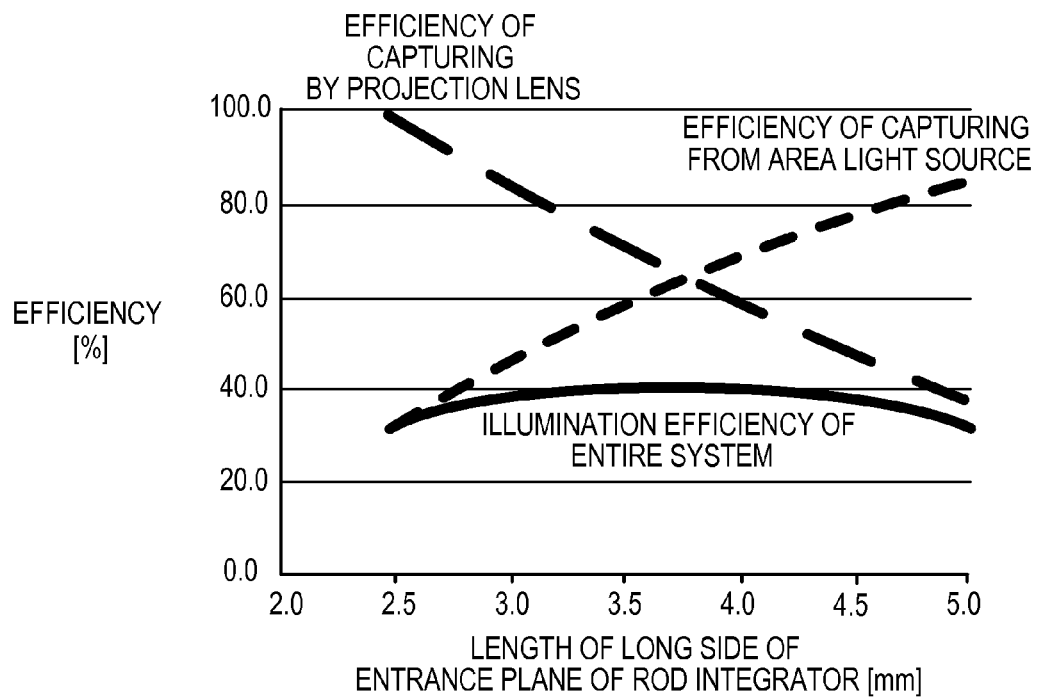
FIG. 3 is a graph for explaining the first embodiment.

FIG. 3 shows this relationship. In FIG. 3, the abscissa represents the length of the long side of the entrance plane 1031 of the rod integrator 103 having the cuboid shape, and the ordinate represents the light capturing efficiency. FIG. 3 shows the efficiency of light capturing by the rod integrator 103 from the area light source 102 ("efficiency of capturing from area light source") when the length of the long side of the entrance plane 1031 of the rod integrator 103 is changed. FIG. 3 also shows the efficiency of light capturing by the projection lens 107 from the rod integrator 103 ("efficiency of capturing by projection lens"). FIG. 3 further shows the illumination efficiency ("efficiency of capturing from area light source"×"efficiency of capturing by projection lens") of the entire system. As is apparent from FIG. 3, when the long side of the entrance plane 1031 of the rod integrator 103 is made short, the efficiency of light capturing by the rod integrator 103 from the area light source 102 lowers, whereas the efficiency of light capturing by the projection lens 107 from the rod integrator 103 rises. As a result, the illumination efficiency of the entire system is maximized when the size of the entrance plane 1031 of the rod integrator 103 is made smaller than that of the area light source 102.

As described above, making the size of the entrance plane 1031 of the rod integrator 103 smaller than that of the area light source 102 makes it possible to raise the efficiency of capturing by the projection lens 107 and thus raise the illumination efficiency of the entire system.

In the example shown in FIG. 3, the length of the long side of the entrance plane 1031 of the rod integrator 103 having the cuboid shape is 4 mm when the size of the entrance plane 1031 of the rod integrator 103 equals that of the area light source 102. The area of the entrance plane of the rod integrator necessary to obtain an illumination efficiency higher by 1% than the illumination efficiency of the entire system when the size of the entrance plane of the rod integrator equals that of the area light source is 70% (inclusive) to 90% (inclusive) of the area of the area light source.

In the first design example, the f-number of the projection lens 107 on the object side is 2.4. When the f-number of the projection lens 107 on the object side is large, that is, when the solid angle of light that the projection lens 107 can capture is small, the efficiency of light capturing by the projection lens 107 lowers. Hence, the graph of "efficiency of capturing by projection lens" in FIG. 3 shifts to the left. For this reason, the illumination efficiency of the entire system is readily maximized by making the size of the entrance plane of the rod integrator 103 smaller than that of the area light source 102. Hence, the f-number of the projection lens 107 on the object side is preferably 2.0 or more.

Figure 4:
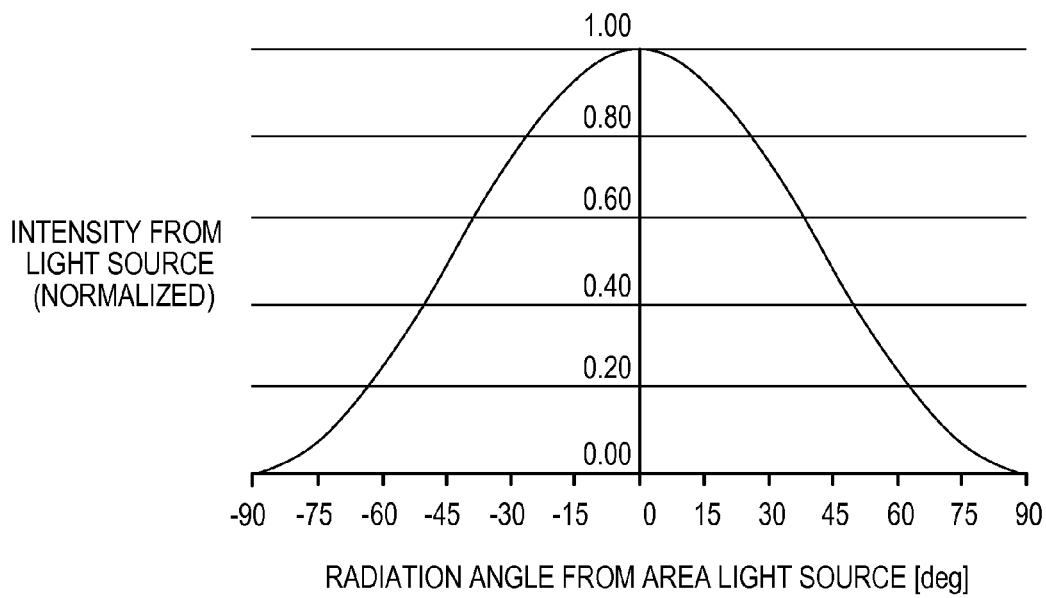
FIG. 4 is a graph for explaining the first embodiment.

In the first design example, the half bandwidth of the radiation angle distribution of the area light source 102 is 90° (±45°), as shown in FIG. 4. When the half bandwidth of the radiation angle distribution of the area light source 102 is small, that is, when the exit intensity in the 0° direction is high, the rod integrator 103 can capture the light in the 0° direction even if the entrance plane is small. That is, when the half bandwidth of the radiation angle distribution of the area light source 102 is small, the efficiency of light capturing from the area light source 102 rises, and the graph of "efficiency of light capturing from area light source" in FIG. 3 shifts to the left. For this reason, the illumination efficiency of the entire system is readily maximized by making the size of the entrance plane of the rod integrator 103 smaller than that of the area light source 102. Hence, the half bandwidth of the radiation angle distribution of the area light source 102 is preferably 100° or less.

In the first design example, the area of the spatial light modulator 106 is 7.8 times larger than that of the area light source 102. When the area ratio between the spatial light modulator 106 and the area light source 102 is small, the solid angle of light that enters the spatial light modulator 106 becomes large based on the etendue conservation law, and the efficiency of light capturing by the projection lens lowers. Hence, the graph of "efficiency of capturing by projection lens" in FIG. 3 shifts to the left. For this reason, the illumination efficiency of the entire system is readily maximized by making the size of the entrance plane of the rod integrator 103 smaller than that of the area light source 102. Hence, the area of the spatial light modulator 106 is preferably 10 times or less of that of the area light source 102.

In the first design example, the area of the entrance plane of the rod integrator 103 is 81% of that of the area light source 102. However, as is apparent from FIG. 3, if the area of the entrance plane of the rod integrator 103 is too small, the efficiency of light capturing from the area light source lowers, and the illumination efficiency of the entire system lowers. Hence, the area of the entrance plane of the rod integrator 103 is preferably ½ or more of that of the area light source 102.

In the first design example, the interval between the area light source 102 and the entrance plane 1031 of the rod integrator 103 is 1 mm. The rod integrator 103 can capture light that exits from the center of the area light source 102 at an angle of 50° or more. When the interval between the area light source 102 and the entrance plane 1031 of the rod integrator 103 is small, the rod integrator 103 can capture a large amount of light from the area light source 102 even if the entrance plane 1031 is small. Hence, when the interval between the area light source 102 and the entrance plane 1031 of the rod integrator 103 becomes small, the graph of "efficiency of capturing from area light source" in FIG. 3 shifts to the left. For this reason, the illumination efficiency of the entire system is readily maximized by making the size of the entrance plane of the rod integrator 103 smaller than that of the area light source 102. Hence, the equivalent air distance of the interval between the area light source 102 and the entrance plane 1031 of the rod integrator 103 is preferably ½ or less of the length of the short side of the rod integrator 103.

Figure 5:
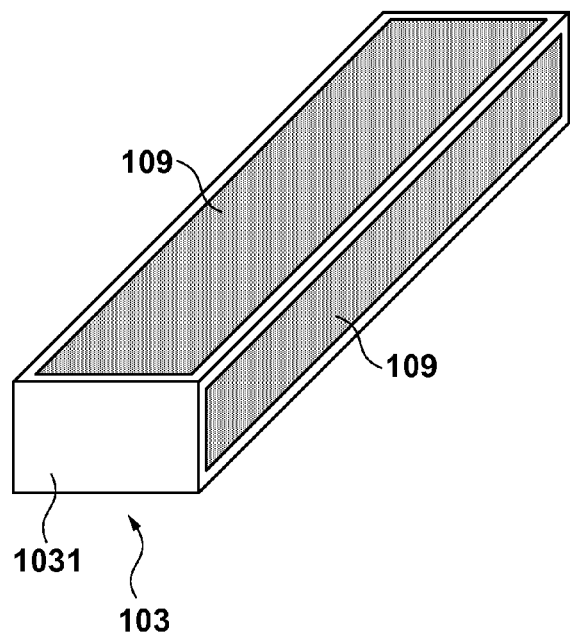
FIG. 5 is a perspective view showing a modification of the first embodiment.

The rod integrator 103 can have either a solid structure or a hollow structure. As shown in FIG. 5, the rod integrator 103 may include reflective films 109 provided on the side surfaces. If no reflective film 109 is provided on the side surfaces of the rod integrator 103, the light is not reflected at all by a portion where the rod integrator 103 and a holding member holding the rod integrator are in contact with each other, resulting in a loss. When the reflective film 109 is provided, and the holding member holds the rod integrator 103 at the portion where the reflective film 109 exists, the loss can be reduced.

Figure 6A:
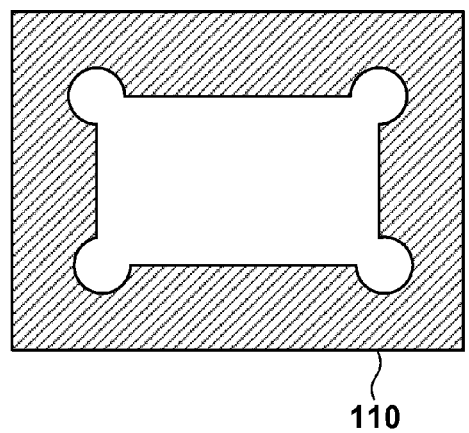
FIGS. 6A and 6B are views showing the modification of the first embodiment.
Figure 6B:
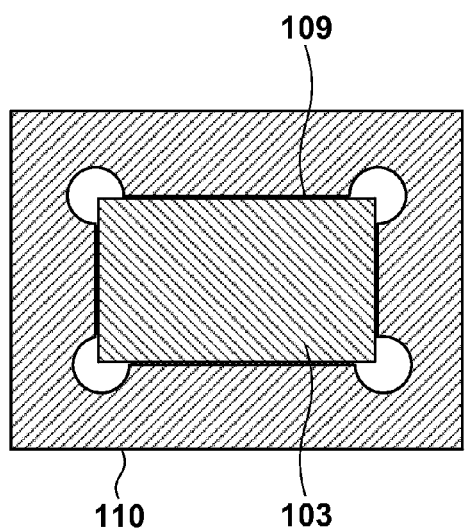

As shown in FIG. 5, the reflective film 109 is not provided all over each side surface of the rod integrator 103, that is, each side surface of the rod integrator 103 may include a first portion where the reflective film 109 is provided and a second portion where the reflective film is not provided. In this case, a holding member 110 as shown in FIG. 6A is preferably employed to hold the rod integrator 103 at the first portions out of the first portions and the second portions, as shown in FIG. 6B.

The aspect ratio (length of long side:length of short side) of the exit plane 1032 of the rod integrator 103 is preferably the same as that of the spatial light modulator 106. This obviates the necessity of using an anamorphic lens as the relay lens 104, the manufacturing cost of the illumination system 150 can be reduced. The aspect ratio of the exit plane 1032 of the rod integrator 103 and that of the spatial light modulator 106 can be, for example, 4:3.

The spatial light modulator 106 may be a transmissive or reflective liquid crystal display device. In this case, light that enters the liquid crystal display device and light that exits from the liquid crystal display device can be separated using a PBS (Polarization Beam Splitter) in place of the TIR prism.

Figure 7:
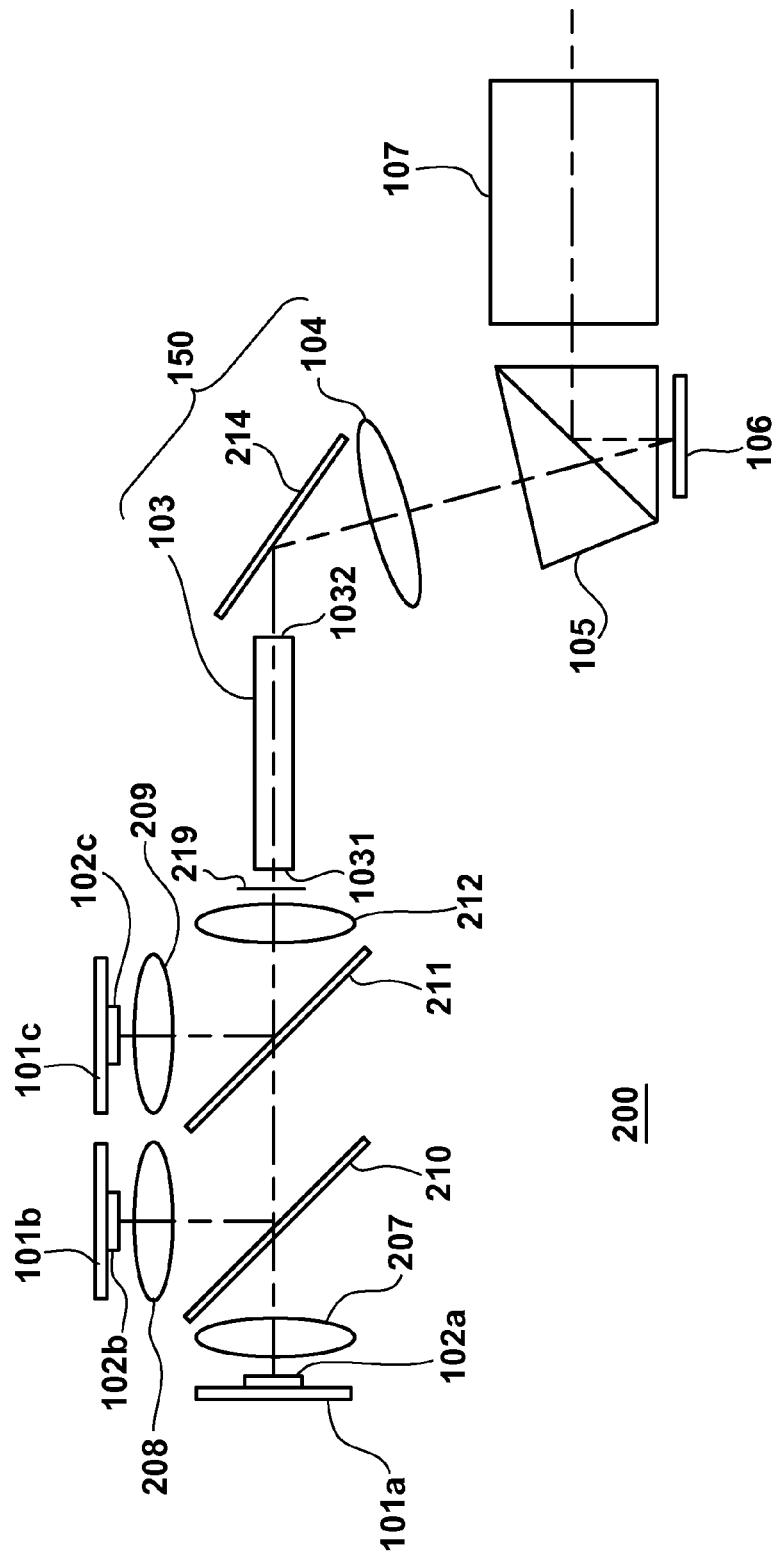
FIG. 7 is a view showing the schematic arrangement of a projector according to the second embodiment.

FIG. 7 shows the schematic arrangement of a projector 200 according to the second embodiment of the present invention. Matters that are not mentioned in the second embodiment can comply with the first embodiment. In the second embodiment, the first embodiment is applied to a color projector.

The projector 200 can include first area light sources 102a to 102c, a spatial light modulator 106, and an illumination system 150 that receives light from the images of the first area light sources 102a to 102c, which serve as a second area light source 219, and illuminates the spatial light modulator 106. The projector 200 can also include a projection lens 107 that forms an image by the light from the spatial light modulator 106.

The first area light sources 102a to 102c can be, for example, the light emitting regions of light emitting devices 101a to 101c such as LEDs. The first area light source 102a is a blue (B) area light source, the area light source 102b is a green (G) area light source, and the area light source 102c is a red (R) area light source. Each of the first area light sources 102a to 102c has, for example, a rectangular shape. Light from the blue area light source 102a is condensed by a lens 207, light from the green area light source 102b is condensed by a lens 208, and light from the red area light source 102c is condensed by a lens 209. A dichroic mirror 210 transmits light from the blue area light source 102a and reflects light from the green area light source 102b. A dichroic mirror 211 transmits light from the dichroic mirror 210 and reflects light from the red area light source 102c. A lens 212 condenses light from the dichroic mirror 211 and forms the images of the first area light sources 102a to 102c (the images of the light emitting regions of the light emitting devices 101a to 101c) as the second area light source 219.

The spatial light modulator 106 can be, for example, a device such as a DMD. The illumination system 150 can include a rod integrator 103, a deflecting mirror 214, and a relay lens 104. The rod integrator 103 can be an optical member having a cuboid shape and including an entrance plane 1031 and an exit plane 1032. Alternatively, the entrance plane 1031 of the rod integrator 103 can be rectangular. The rod integrator 103 is arranged while making the entrance plane 1031 face the area light source 102. The rod integrator 103 causes the entrance plane 1031 to receive light emitted by the area light source 102 and the side surfaces to reflect the light a plurality of times, thereby forming a uniform illuminance distribution on the exit plane 1032.

The projector 200 may include a TIR prism 105. The TIR prism 105 is formed by bonding two triangular prisms at a very small air gap. The TIR prism 105 transmits light from the relay lens 104, and reflects the light reflected by the spatial light modulator 106 by the interface between the two triangular prisms.

In the second design example that is one design example of the second embodiment, the size of each of the first area light sources 102a to 102c is 6×4.5 mm. In addition, the size of the image of each of the first area light sources 102a to 102c serving as the second area light source 219 formed by the lenses 207 and 212 is 4.8×3.6 mm. The rod integrator 103 has a cuboid shape. The size of the entrance plane 1031 of the rod integrator 103 is 4×3 mm, and the length of the rod integrator 103 (the distance between the entrance plane 1031 and the exit plane 1032) is 25 mm. The size of the DMD as the spatial light modulator 106 is 11.2×8.4 mm. The f-number of the projection lens 107 on the object side is 2.2.

The size of the entrance plane 1031 of the rod integrator 103 is smaller than that of each of the images of the first area light sources 102a to 102c, as the second area light source 219, formed by the lenses 207 and 212. Hence, even if the second area light source 219 and the rod integrator 103 are shifted with respect to a direction perpendicular to the optical axis, the decrease in the amount of light capturing by the rod integrator 103 is small as long as the entrance plane of the rod integrator 103 falls within the range of the size of the second area light source 219. Hence, the alignment accuracy required between the area light sources 102a to 102c, the lenses 207 and 212, the dichroic mirrors 210 and 211, and the rod integrator 103 with respect to the direction perpendicular to an optical axis AX becomes low. This, for example, obviates the necessity of accurately processing the holding member of the area light sources 102a to 102c, the lenses 207 and 212, the dichroic mirrors 210 and 211, and the rod integrator 103. It is therefore possible to reduce the cost. In addition, the attachment accuracy of the area light source 102 required when exchanging it due to a fault or the like is low. This facilitates the exchange.

In the second design example, the f-number of the projection lens 107 on the object side is 2.2, the half bandwidth of the radiation angle distribution of the area light sources 102a to 102c is 80° (±40°), and the size of the DMD as the spatial light modulator 106 is 5.4 times larger than that of the second area light source 219. In addition, the size of the entrance plane 1031 of the rod integrator 103 is 69% of that of the second area light source 219, and the interval between the second area light source 219 and the entrance plane 1031 of the rod integrator 103 is 0.8 mm. The illumination efficiency of the entire system is readily maximized by making the size of the entrance plane 1031 of the rod integrator 103 smaller than that of the second area light source 219. Hence, the size of the entrance plane 1031 of the rod integrator 103 is made smaller than that of the second area light source 219, thereby raising the efficiency of light capturing by the projection lens 107 and raising the illumination efficiency of the entire system.

In the second embodiment, the deflecting mirror 214 arranged in the optical path between the rod integrator 103 and the projection lens 107 makes the optical axis of the rod integrator 103 parallel to that of the projection lens 107. This simplifies the positional relationship between the second area light source 219, the rod integrator 103, and the projection lens 107, and facilitates the design and manufacturing of the case storing these members, resulting in a lower manufacturing cost. In the second embodiment, the optical axis of the rod integrator 103 is made parallel to that of the projection lens 107. However, the deflecting mirror 214 may be arranged to make the optical axes perpendicular to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288562, filed Dec. 28, 2012, which is hereby incorporated by reference herein in its entirety.

What is claimed is:

1. A projector comprising:
a light emitting diode (LED);
a spatial light modulator;
an illumination system that receives light from the LED and illuminates the spatial light modulator; and
a projection lens that forms an image by the light from the spatial light modulator,
wherein the LED has a light emitting region as an area light source,
wherein the illumination system includes a rod integrator, the rod integrator being arranged so that an entrance plane of the rod integrator faces the light emitting region, and so that a size of the entrance plane of the rod integrator is smaller than a size of the light emitting region, and
wherein when illumination efficiency is defined as an efficiency of capturing light from the light emitting region with the rod integrator multiplied by an efficiency of capturing light from the rod integrator with the projection lens, then the size of the entrance plane of the rod integrator is set so that an illumination efficiency when the set size is used is higher than an illumination efficiency when the size of the entrance plane of the rod integrator is the same as the size of the light emitting region.

2. The projector according to claim 1, wherein an area of the spatial light modulator is not more than 10 times an area of the area light source.

3. The projector according to claim 1, wherein an f-number of the projection lens on an object side is not less than 2.0.

4. The projector according to claim 1, wherein a half bandwidth of a radiation angle distribution of the area light source is not more than 100°.

5. The projector according to claim 1, wherein an area of the entrance plane of the rod integrator is not less than 70% and is not greater than 90% of an area of the area light source.

6. The projector according to claim 1, wherein a reflective film is provided on a side surface of the rod integrator.

7. The projector according to claim 1, wherein a side surface of the rod integrator includes a first portion where a reflective film is provided and a second portion where the reflective film is not provided, and
wherein the rod integrator is held by a holding member at the first portion out of the first portion and the second portion.

8. The projector according to claim 1, further comprising a deflecting mirror arranged in an optical path between the rod integrator and the projection lens.

9. The projector according to claim 1, wherein an aspect ratio of an exit plane of the rod integrator is the same as an aspect ratio of the spatial light modulator.

10. The projector according to claim 1, wherein the entrance plane of the rod integrator is rectangular, and
wherein an equivalent air distance between the light emitting region and the entrance plane of the rod integrator is not more than half of a length of a short side of the entrance plane of the rod integrator.

11. The projector according to claim 1, wherein the rod integrator captures light emitted from the light emitting region of the LED at a radiation angle of 50° or more on the entrance plane of the rod integrator.

12. The projector according to claim 11, wherein a half bandwidth of a radiation angle distribution of the area light source is not more than 100°.

13. A projector comprising:
a light emitting device;
a spatial light modulator;
an illumination system that receives light from the light emitting device and illuminates the spatial light modulator; and
a projection lens that forms an image by the light from the spatial light modulator, wherein the light emitting device has a light emitting region as an area light source, wherein the illumination system includes a rod integrator, the rod integrator being arranged so that an entrance plane of the rod integrator faces the light emitting region, and so that a size of the entrance plane of the rod integrator is smaller than a size of the light emitting region, and wherein when illumination efficiency is defined as an efficiency of capturing light from the light emitting region with the rod integrator multiplied by an efficiency of capturing light from the rod integrator with the projection lens, then the size of the entrance plane of the rod integrator is set so that an illumination efficiency when the set size is used is higher than an illumination efficiency when the size of the entrance plane of the rod integrator is the same as the size of the light emitting region.

* * * * *